United States Patent [19]

Berendt

[11] Patent Number: 5,028,237

[45] Date of Patent: Jul. 2, 1991

[54] DYEING PROCESS USING GRAFT POLYMERS WHICH ARE WATER SOLUBLE OR DISPERSIBLE IN WATER AS DYEING ASSISTANTS

[75] Inventor: Hans-Ulrich Berendt, Allschwil, Switzerland

[73] Assignee: Ciba-Geigy Corporation, Ardsley, N.Y.

[21] Appl. No.: 587,386

[22] Filed: Sep. 25, 1990

Related U.S. Application Data

[62] Division of Ser. No. 414,996, Sep. 29, 1989, Pat. No. 4,975,524.

[30] Foreign Application Priority Data

Oct. 3, 1988 [CH] Switzerland ............... 3665/88

[51] Int. Cl.$^5$ .............. C09B 67/00; C08G 65/32
[52] U.S. Cl. .............................. 8/555; 8/554; 8/444; 528/271; 528/363; 528/366
[58] Field of Search .................. 8/555, 554, 444

[56] References Cited

U.S. PATENT DOCUMENTS

| 4,494,956 | 1/1985 | Schafer et al. | 8/555 X |
|---|---|---|---|
| 4,604,099 | 8/1986 | Berendt et al. | 8/555 X |
| 4,612,016 | 9/1986 | Jaeger et al. | 8/555 X |
| 4,613,335 | 9/1986 | Berendt et al. | 8/555 X |
| 4,705,525 | 11/1987 | Abel | 8/555 |
| 4,861,342 | 8/1989 | Danel | 8/555 X |

*Primary Examiner*—Earl Nielsen
*Attorney, Agent, or Firm*—George R. Dohmann; Edward McC. Roberts

[57] ABSTRACT

Graft polymers which are obtainable from
(A) 2-30% by weight of an addition product from alkylene oxide onto an aliphatic alcohol which is at least trihydric having 3 to 10 carbon atoms and
(B) 70-98% by weight of a grafted-on monomer mixture of
  (1) 20 to 50% by weight of an N-substituted or N-unsubstituted acrylamide or methacrylamide and
  (2) 50 to 80% by weight of an N-vinyl-substituted amide or of a vinyl ester, derived in each case from a saturated aliphatic monocarboxylic acid, where the sums of (A) and (B), and (1) and (2) in each case add up to 100%.

These novel graft polymers are suitable as dyeing assistants, particularly as padding assistants or liquor binders when dyeing cellulose fibre materials.

8 Claims, No Drawings

DYEING PROCESS USING GRAFT POLYMERS WHICH ARE WATER SOLUBLE OR DISPERSIBLE IN WATER AS DYEING ASSISTANTS

This is a divisional of application Ser. No. 414,996 filed on Sept. 29, 1989 now U.S. Pat. No. 4,975,524, Dec. 4, 1990.

The present patent application relates to novel graft polymers which are water-soluble or dispersible in water, processes for their preparation and their multifarious use, for example as dyeing assistants such as padding assistants or liquor binders, or as textile assistants for example in foam printing processes.

The novel graft polymers are those which are obtainable from (A) 2–30% by weight of an addition product from alkylene oxide onto an aliphatic alcohol which is at least trihydric having 3 to 10 carbon atoms and (B) 70–98% by weight of a grafted-on monomer mixture of (1) 20 to 50% by weight of an N-substituted or N-unsubstituted acrylamide or methacrylamide and (2) 50 to 80% by weight of an N-vinyl-substituted amide or of a vinyl ester, derived in each case from a saturated aliphatic monocarboxylic acid, where the sums of (A) and (B), and (1) and (2) in each case add up to 100%.

In the present preparation of the graft base (component (A)), suitable alkylene oxides have from 2 to 4 carbon atoms and are ethylene oxide, propylene oxide, butylene oxide or ethylene oxide and propylene oxide alternately or mixtures of ethylene oxide and propylene oxide. Propylene oxide is preferred. The aliphatic alcohols may be trihydric to hexahydric.

Suitable graft bases are addition products from 4 to 100 mol, preferably 40 to 80 mol of propylene oxide onto trihydric to hexahydric alkanols having 3 to 6 carbon atoms. These alkanols may be straight-chain or branched. Examples thereof are glycerol, trimethylolethane, trimethylolpropane, erythritol, pentaerythritol, mannitol or sorbitol.

Other suitable graft bases are addition products from mixtures of ethylene oxide and propylene oxide or also from ethylene oxide alone onto the polyhydric alcohols mentioned.

Particularly suitable graft bases are those from addition products from 40 to 80 mol of propylene oxide onto 1 mol of glycerol.

Examples of monomers (1) used according to the invention are acrylamide or methacrylamide, which may for example in each case be N-substituted by $C_1$–$C_5$alkyl radicals, $C_2$–$C_4$hydroxyalkyl groups, $C_2$–$C_4$alkoxyalkyl groups, di-$C_1$–$C_4$-alkylamino-$C_1$–$C_5$-alkyl groups or by acetyl or acetyl-$C_1$–$C_5$alkyl or by —CH$_2$CONH$_2$ or

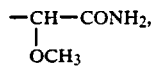

for example N-methylacrylamide, N,N-dimethylacrylamide, N-methoxymethylacrylamide, N-β-hydroxyethylacrylamide, N-diacetoneacrylamide, N-acetylacrylamide, N-acryloylamidoacetamide (acryloylglycine) or N-acryloylamidomethoxyacetamide and also N,N-di-β-hydroxyethylacrylamide, Mannich bases of acrylamide and methacrylamide, for example N-di($C_1$–$C_4$alkylamino)methyl-acrylamides and other N-alkyl-substituted acrylamides or methacrylamides, which bear a tertiary amino group on the alkyl radical, for example dimethylaminopropylacrylamide, diethylaminopropylacrylamide, dimethylaminopropylmethacrylamide, dimethylamino-2,2-dimethylpropylacrylamide or dimethylamino-2,2-dimethylpropylmethacrylamide. Mixtures of the acrylamide monomers (1) may also be used. Methacrylamide or particularly acrylamide are particularly preferred acrylamide monomers (1).

The vinyl compounds (2) which are to be concomitantly used according to the invention include particularly N-vinyl-substituted amides of aliphatic saturated monocarboxylic acids having 1 to 4 carbon atoms, for example N-vinylformamide, N-vinyl-N-methylformamide, N-vinylacetamide, N-methyl-N-vinylacetamide, and N-ethyl-N-vinylacetamide. Vinyl compounds (2) are furthermore to be understood as meaning vinyl esters of aliphatic saturated monocarboxylic acids having 1 to 4 C atoms, for example vinyl acetate, vinyl propionate or vinyl butyrate.

The graft polymers according to the invention advantageously contain 4 to 15% by weight of the defined addition product (A) as base polymer and 85 to 96% by weight of the grafted-on mixture (B). The monomer mixture comprises in particular 25 to 48% by weight of the acrylamide compound (1) and 52 to 75% by weight of the vinyl compound (2). Both the sum of the components (A) and (B) and also of the components (1) and (2) amounts to 100%.

Among these products, those which are preferred contain 3 to 10% by weight of the addition product from 40 to 80 mol of propylene oxide onto 1 mol of glycerol as graft base, 35 to 48% by weight of acrylamide and 42 to 60% by weight of N-methyl-N-vinylacetamide, the sum of the reacted components being 100%. The percentages given relate to the total graft copolymer.

The preparation of the graft polymers used according to the invention is carried out by methods known per se, advantageously in such a way that (a) an addition product from an alkylene oxide onto an aliphatic alcohol which is at least trihydric having 3 to 10 carbon atoms is polymerised with (b) the monomer mixture of (1) and (2) in the presence of catalysts, advantageously at a temperature of 40° to 100° C. Graft polymers are thus predominantly obtained, in which the alkylene oxide adduct forms the core chain which contains the grafted-on monomer mixture in the form of side chains attached to carbon atoms.

During the graft polymerisation for the purpose of preparing the polymers according to the invention, copolymers of the monomers (1) and (2) often occur additionally as byproducts. These byproducts occur in particular when large amounts of monomers (1) and (2) are grafted onto small amounts of the base polymer (A).

Free-radical forming organic or inorganic initiators are advantageously used as catalysts. Suitable organic initiators for carrying out the free-radical polymerisation are for example azoamides, for example azo-bis-2-methyl-(1,1-dimethyl-2-hydroxyethyl)propionamide, 2,2′-azo-bis(2-methylpropiohydroxyamic acid), 2,2′-azo-bis-2-[N-phenylamidino]-propane dihydrochloride, 2,2′-azo-bis-2-methylpropionyl hydrazide, 2,2′-azo-bis-N,N-dimethyleneisobutylamidine or particularly 2,2′-azo-bis(2-amidino-propane) dihydrochloride. Suitable inorganic initiators are hydrogen peroxide, perborates, percarbonates, for example sodium percarbonate, persulaftes, peroxydisulfates, for example potassium peroxydisulfate as well as known redox systems from the relevant literature.

These catalysts can be used in amounts of 0.05 to 2 percent by weight, advantageously 0.05 to 1 percent by weight and preferably 0.1 to 0.5 percent by weight, relative to the starting materials.

The graft polymerisation is advantageously carried out in an inert atmosphere, for example in the presence of nitrogen.

The graft polymers occur as very viscous materials. By dissolving and diluting with water gel-like products with a dry solids content of for example 0.5 to 20% by weight, preferably 2 to 10% by weight can be prepared. In order to preserve and/or improve the shelf life of the aqueous graft copolymer solutions obtained, preservatives can be added, for example chloroacetamide, N-hydroxymethylchloroacetamide, pentachlorophenolates, alkali metal nitrites, triethanolamine or hydroquinone monomethyl ether or also antibacterial agents, for example sodium azide or surface-active quaternary ammonium compounds, which have one or two fatty alkyl radicals. Mixtures of these preservatives and germicidal compounds may also be advantageously used.

The particularly preferred 2-10% by weight solutions of the graft polymers obtained do not have ideal viscous flow characteristics but pseudoplastic flow characteristics. At 20° C., according to the shear rate, they have a dynamic viscosity between 100 and 100,000, preferably 1,000 to 50,000 and particularly 1,000 to 20,000 mPa s (milli Pascal second).

The novel graft polymers are used in particular as dyeing assistants in continuous or semicontinuous dyeing (or printing) of cellulose-containing textile material.

Accordingly, the invention also provides a process for dyeing textile materials which consist wholly or partially of cellulose fibres, with direct dyes or preferably with reactive dyes, which process comprises impregnating the textile materials with an aqueous liquor which contains graft polymers according to the invention in addition to the dyes, and then fixing the dyes by the action of heat or by the cold pad-batch process.

The amounts in which the graft polymer is added to the dyeing liquors may vary within wide limits. Thus, advantageous amounts are those from 2 to 40 g, preferably 5 to 20 g in the form of 3 to 10% aqueous solutions per liter of dyeing liquor.

The graft polymers according to the invention are particularly suitable for the continuous or semi-continuous dyeing of textiles which consist of cellulose or contain cellulose, with direct dyes or preferably reactive dyes, it being possible to subject the cellulose materials to a heat treatment process after impregnation in order to fix the applied dyes. The fixation of the dyes is preferably carried out by the cold pad-batch process.

Suitable cellulose fibre materials are regenerated or in particular natural cellulose, for example staple viscose, filament viscose, hemp, linen, jute or preferably cotton, as well as fibre mixtures for example those of polyamide/cotton, or in particular of polyester/cotton, it being possible to dye the polyester component with disperse dyes beforehand, simultaneously or subsequently.

The textile material may be used in any form, for example yarns, hanks, woven fabrics, knitted fabrics, felts, preferably in the form of textile sheet-like structures, such as woven fabrics, knitwear or carpet, which consist wholly or partially of native, regenerated or modified cellulose. Both pretreated material and material in the grey or brown state may be used.

The customary direct dyes are suitable as direct dyes, for example the "Direct Dyes" mentioned in the Colour Index, 3rd edition (1971) volume 2 on pages 2005-2478.

Reactive dyes are to be understood as meaning the customary dyes which enter into a chemical bond with the cellulose, for example the "Reactive Dyes" listed in Colour Index, in volume 3 (3rd edition, 1971) on pages 3391-3560 and in volume 6 (revised 3rd edition, 1975) on pages 6268-6345. Vat dyes may also be used.

As a rule, the amount of dyes is governed by the desired depth of shade and is advantageously 0.1 to 80 g per liter of liquor, preferably 2 to 50 g/l of liquor.

As a rule, when reactive dyes are used, the preparations contain fixing alkalis.

Compounds reacting as alkalis for the fixation of reactive dyes are for example sodium carbonate, sodium bicarbonate, sodium hydroxide, disodium phosphate, trisodium phosphate, borax, aqueous ammonia or alkali donors, for example sodium trichloroacetate. In particular, a mixture of water glass and a 30% aqueous sodium hydroxide solution has very good utility as alkali.

The pH value of the dyeing liquors containing alkali is as a rule 7.5 to 13.2 preferably 8.5 to 11.5.

The dyeing liquors are advantageously prepared by dissolving the dye and by adding the graft polymers according to the invention and adding alkali if desired. Depending on the dye used, the dyeing liquors may contain other customary additives, for example electrolytes, for example sodium chloride or sodium sulfate and also sequestering agents, reduction inhibitors, for example sodium nitrobenzenesulfonate and furthermore urea, glycerol and/or sodium formate. If desired, thickening agents, for example alginates, cellulose derivatives, starch ethers or meal ethers such as carob bean meal ethers may also be contained therein.

The impregnation of the cellulose-containing textile material may be carried out by coating, spraying or preferably by padding with the dyeing liquor.

After impregnation, the dyes are fixed by a heat treatment or preferably by the cold pad-batch method.

The thermofixing step can be carried out by steaming, hot batching, thermosoling or by microwave treatment.

In steaming, in order to fix the dyes, the textile materials impregnated with the dyeing liquor are subjected to treatment in a steamer using steam which if desired may be superheated, the said treatment being carried out advantageously at a temperature of 98° to 210° C., advantageously 100° to 180° C. and preferably 102° to 120° C.

In hot batching, the impregnated material is allowed to remain in the moist state for example for 1 to 120 minutes, advantageously at temperatures of 85° to 102° C. In this case the wetted material can be preheated to 85° to 102° C. by infrared treatment. The residence temperature is preferably 95° to 100° C.

The fixation of the dyes by thermosoling may be carried out with or without intermediate drying, for example at a temperature of 100° to 210° C. Thermosoling is preferably carried out at a temperature of 120° to 220° C., preferably 140° to 180° C. and after intermediate drying of the impregnated material at 80° to 120° C. Depending on the temperature, the thermosoling may take from 20 seconds to 5 minutes, preferably from 30 to 60 seconds.

The thermofixing of the dyes can also be carried out by means of microwaves. In this case the material, after impregnation with the dyeing liquor, is treated continuously or discontinuously and inside a chamber using microwaves.

The microwave treatment may take from 5 seconds to 120 minutes. Preferably, 30 seconds to 5 minutes is sufficient. Microwaves are defined as electromagnetic waves (radio waves) in the frequency range from 300 to 100,000 MHz, preferably from 1,000 to 30,000 MHz (mega hertz).

The fixation of the dyes according to the cold pad-batch process is advantageously carried out by storing the impregnated and preferably plaited-down or rolled-up materials at room temperature (15° to 30° C.) for example for 3 to 24 hours, in which case it is known that the cold residence time is dye-dependent. If desired, the material may also be stored at a slightly elevated temperature (30° to 80° C.).

After the dyeing process the dyed cellulose material can be rinsed in the customary manner in order to remove unfixed dye. For this purpose, the substrate is treated for example at 40° C. up to the boiling point in a solution containing soap or synthetic washing agent. Treatment with a fixing agent can then be carried out in order to improve the wet fastness properties.

With the process according to the invention level and deep dyeings are obtained, which are distinguished by having an even appearance. Moreover, the end-use fastness properties of the dyed material, for example light fastness, crock fastness and wet fastnesses are not adversely affected by the use of the defined graft copolymer. In particular, an outstanding penetration of the material or untreated material can be achieved.

The graft polymers according to the invention are also suitable for use in dyeing or printing cellulose-containing textile material with reactive dyes or vat dyes assisted by foam, in which processes they contribute significantly to the crispness and moreover can be worked with the exclusion of the customary thickeners, particularly alginates.

In the following examples, unless stated otherwise, the percentages are by weight. In the case of the dyes, the amounts relate to commercially available, i.e. cut products and in the case of assistants to the pure substance.

PREPARATION EXAMPLES

Example 1

A solution is prepared from 34.12 g of acrylamide, 51.55 g of N-methyl-N-vinylacetamide, 3.75 g of an addition product from propylene oxide onto glycerol having an average molecular weight of 4,200 and 0.09 g of 2,2'-azobis(2-amidinopropane) hydrochloride in 300 g of water and the said solution is heated to 60° C. in the course of 10 minutes while stirring the solution and passing nitrogen above it. After a further 10 minutes the viscosity of the solution quickly increases. The solution is diluted over a period of 1½ hours by adding 1102.3 g of water dropwise; after the addition of water, the solution is thoroughly stirred for 1 hour at 60° C. and then is subsequently stirred for a further 12 hours for homogenization. 0.01 g of chloroacetamide is added and the mixture is cooled with stirring to room temperature. 1491.7 g of a slightly opaque solution are obtained having a polymer content of 6% by weight.

The product has pseudoplastic characteristics. Dynamic viscosity of a 1.5% solution in mPa s at 20° C. as a function of the measured shear rate D.

Instrument: Rheomat RM 15,MS 45.

Shear rate D ($s^{-1}$): 8.35, 11.1, 14.3, 19.0, 24.9, 35.3, 47.1, 61.5, 81.1, 106, 153.

Dynamic viscosity $\eta$ (mPa s): 429, 396, 357, 316, 279, 233, 200, 175, 152, 131, 107.

Example 2

A solution is prepared from 34.5 g of acrylamide, 40.5 g of N-methyl-N-vinylacetamide, 3.8 g of an addition product from propylene oxide onto glycerol having an average molecular weight of 4,200 and 0.09 g of 2,2'-azobis(2-amidinopropane) hydrochloride in 300 g of water and heated to 65° C. in the course of 10 minutes while stirring the solution and passing nitrogen above it. After a further 20 minutes the viscosity of the solution quickly increases. The solution is diluted over a period of 1½ hours by adding 933.8 g of water dropwise; after the addition of water, the solution is thoroughly stirred for 1 hour at 60° C. and then subsequently stirred for a further 12 hours for homogenization. 0.01 g of chloroacetamide is added and the mixture is cooled with stirring to room temperature. 1312.6 g of a slightly opaque solution are obtained having a polymer content of 6 percent by weight.

The product has pseudoplastic characteristics. Dynamic viscosity of a 1.5% solution in mPa s at 20° C. as a function of the measured shear rate D.

Instrument: Rheomat RM 15,MS 45.

Shear rate D ($s^{-1}$): 8.35, 11.1, 14.3, 19.0, 24.9, 35.3, 47.1, 61.5, 81.1, 106.

Dynamic viscosity $\eta$ (mPa s): 464, 429, 387, 343, 304, 256, 222, 196, 170, 148.

Example 3

A solution is prepared from 34.5 g of acrylamide, 40.5 g of N-methyl-N-vinylacetamide, 5.7 g of an addition product from propylene oxide onto glycerol having an average molecular weight of 4,200 and 0.09 g of 2,2'-azobis(2-amidinopropane) hydrochloride in 300 g of water and heated to 60° C. in the course of 10 minutes while stirring the solution and passing nitrogen above it. After a further 25 minutes the viscosity of the solution quickly increases. The solution is diluted over a period of 1½ hours by adding 1131.5 g of water dropwise; after the addition of water, the solution is thoroughly stirred for 1 hour at 60° C. and then subsequently stirred for a further 12 hours for homogenization. 0.01 g of chloroacetamide is added and the mixture is cooled with stirring to room temperature. 1522.9 g of a slightly opaque solution are obtained having a polymer content of 6 percent by weight.

The product has pseudoplastic characteristics. Dynamic viscosity of a 1.5% solution in mPa s at 20° C. as a function of the measured shear rate D.

Instrument: Rheomat RM 15,MS 45.

Shear rate D ($s^{-1}$): 8.35, 11.1, 14.3, 19.0, 24.9, 35.3, 47.1, 61.5, 81.1, 106, 153.

Dynamic viscosity $\eta$ (mPa s): 407, 380, 344, 306, 273, 230, 200, 176, 154, 134, 111.

Example 4

A solution is prepared from 34.12 g of acrylamide, 51.55 g of N-methyl-N-vinylacetamide, 1.9 g of an addition product from propylene oxide onto glycerol having an average molecular weight of 4,200 and 0.09 g of 2,2'-azobis(2-amidinopropane) hydrochloride in 300 g of water and heated to 60° C. in the course of 10 minutes while stirring the solution and passing nitrogen above it. After a further 60 minutes the viscosity of the solution quickly increases. The solution is diluted over a period of 1½ hours by adding 1071.9 g of water dropwise; after the addition of water, the solution is thoroughly stirred for 1 hour at 60° C. and then subsequently stirred for a further 12 hours for homogenization. 0.01 g of chloroacetamide is added and the mixture is cooled with stirring to room temperature. 1459.5 g of a slightly opaque solution are obtained having a polymer content of 6 percent by weight.

The product has pseudoplastic characteristics. Dynamic viscosity of a 1.5% solution in mPa s at 20° C. as a function of the measured shear rate D.

Instrument: Rheomat RM 15, MS 45.

Shear rate D $(s^{-1})$: 8.35, 11.1, 14.3, 19.0, 24.9, 35.3, 47.1, 61.5, 81.1, 106, 153.

Dynamic viscosity $\eta$ (mPa s): 196, 192, 180, 169, 158, 142, 129, 119, 107, 96, 83.

The following graft polymers are prepared in the form of 6% aqueous solutions in a manner identical to that of Examples 1 to 4. Dynamic viscosity of a 1.5% solution in mPa s at 20° C. as a function of the measured shear rate D $(s^{-1})$.

Instrument: Rheomat RM 15, MS 45.

Example 5

Graft polymer consisting of
4.82% of the addition product from propylene oxide onto glycerol MW 4200
47.10% of N,N-dimethylacrylamide
48.08% of N-vinyl-N-methylacetamide Shear rate D $(s^{-1})$: 8.35, 11.1, 14.3, 19.0, 24.9, 35.3, 47.1, 61.5, 81.1, 106, 153.

Dynamic viscosity $\eta$ (mPa s): 83.0, 80.7, 78.1, 75.6, 74.2, 70.8, 67.5, 64.5, 61.1, 57.5, 52.2.

Example 6

Graft polymer consisting of
4.82% of the addition product from propylene oxide onto glycerol MW 4200
42.35% of N-(dimethylaminopropyl)-methacrylamide
52.83% of N-vinyl-N-methylacetamide Shear rate D $(s^{-1})$: 8.35, 11.1, 14.3, 19.0, 24.9, 35.3, 47.1, 61.5, 81.1, 106, 153.

Dynamic viscosity $\eta$ (mPa s): 276, 268, 271, 266, 263, 261, 255, 247, 240, 227, 213.

Example 7

Graft polymer consisting of
4.82% of the addition product from propylene oxide onto glycerol MW 4200
38.07% of acrylamide
9.04% of diacetoneacrylamide
48.07% of N-vinyl-N-methylacetamide Shear rate D $(s^{-1})$: 8.35, 11.1, 14.3, 19.0, 24.9, 35.3, 47.1, 61.5, 81.1, 106, 153.

Dynamic viscosity $\eta$ (mPa s): 253.1, 241.2, 226.3, 207.4, 190.1, 167.7, 149.6, 135.5, 121.3, 107.9, 92.7.

Example 8

Graft polymer consisting of
4.76% of the addition product from propylene oxide onto glycerol MW 4200
46.99% of acrylamide
48.25% of vinyl acetate Shear rate D $(s^{-1})$: 14.3, 19.0, 24.9, 35.3, 47.1, 61.5, 81.1, 106, 153.

Dynamic viscosity $\eta$ (mPa s): 46.3, 44.9, 42.5, 40.4, 38.1, 36.3, 34.4, 32.3, 29.8.

Example 9

Graft polymer consisting of
4.82% of the addition product from propylene oxide onto glycerol MW 4200
45.00% of acrylamide
25.09% of N-vinyl-N-methylacetamide
25.09% of vinyl acetate Shear rate D $(s^{-1})$: 8.35, 11.1, 14.3, 19.0, 24.9, 35.3, 47.1, 61.5, 81.1, 106, 153.

Dynamic viscosity $\eta$ (mPa s): 97.7, 97, 92.5, 87.4, 82.4, 76.8, 70.7, 66.2, 61.3, 56.0, 49.8.

Example 10

Graft polymer made from
5% of the addition product from propylene oxide onto glycerol MW 4200
30% of acrylamide
10% of methacrylamide
55% of N-vinyl-N-methylacetamide Shear rate D $(s^{-1})$: 35.3, 47.1, 61.5, 81.1, 106, 153.

Dynamic viscosity $\eta$ (mPa s): 19.3, 18.9, 18.7, 18.4, 18.4, 18.2.

Example 11

Graft polymer made from
5% of the addition product from propylene oxide onto glycerol MW 4200
40% of acrylamide
6% of diacetoneacrylamide
49% of N-vinyl-N-methylacetamide Shear rate D $(s^{-1})$: 8.35, 11.1, 14.3, 19.0, 24.9, 35.3, 47.1, 61.5, 81.1, 106, 153.

Dynamic viscosity $\eta$ (mPa s): 305, 291, 269, 244, 221, 192, 169, 152, 135, 119, 108.

Example 12

Graft polymer made from
5% of the addition product from propylene oxide onto glycerol MW 4200
35% of acrylamide
10% of N-methoxymethylacrylamide
50% of N-vinyl-N-methylacetamide Shear rate D $(s^{-1})$: 19.0, 24.9, 35.3, 47.1, 61.5, 81.1, 106, 153.

Dynamic viscosity $\eta$ (mPa s): 33.5, 33.1, 32.1, 30.9, 30.7, 30.4, 29.8, 29.0.

Example 13

Graft polymer consisting of
5% by weight of the addition product from propylene oxide onto glycerol MW 4200
45% by weight of N-methylacrylamide
50% by weight of N-vinyl-N-methylacetamide Shear rate D $(s^{-1})$: 8.35, 11.1, 14.3, 19.0, 24.9, 35.3, 47.1, 61.5, 81.1, 106, 153.

Dynamic viscosity $\eta$ (mPa s): 72.5, 71.7, 69.4, 66.6, 64.8, 60.7, 57.8, 55.0, 52.0, 48.7, 44.5.

Example 14

Graft polymer consisting of
5% by weight of the addition product from propylene oxide onto glycerol MW 4200
40% by weight of acrylamide 5% by weight of N-(dimethylaminopropyl)-methacrylamide
50% by weight of N-vinyl-N-methylacetamide Shear rate D (s$^{-1}$): 8.35, 11.1, 14.3, 19.0, 24.9, 35.3, 47.1, 61.5, 81.1, 106.

Dynamic viscosity $\eta$ (mPa s): 382, 357, 326, 292, 262, 226, 200, 178, 157, 139.

Example 15

Graft polymer consisting of
5% by weight of the addition product from propylene oxide onto glycerol MW 4200
35% by weight of acrylamide
10% by weight of N,N-dimethylacrylamide
50% by weight of N-vinyl-N-methylacetamide Shear rate D (s$^{-1}$): 8.35, 11.1, 14.3, 19.0, 24.9, 35.3, 47.1, 61.5, 81.1, 106.

Dynamic viscosity $\eta$ (mPa s): 411, 381, 345, 308, 275, 233, 203, 181, 159, 139.

Example 16

Graft polymer consisting of
5% by weight of the addition product from propylene oxide onto glycerol MW 4200
25% by weight of acrylamide
18% by weight of N-methylacrylamide
52% by weight of N-vinyl-N-methylacetamide Shear rate D (s$^{-1}$): 8.35, 11.1, 14.3, 19.0, 24.9, 35.3, 47.1, 61.5, 81.1, 106, 153.

Dynamic viscosity $\eta$ (mPa s): 181, 178, 168, 155, 145, 130, 117, 107, 96.4, 86.3, 74.8.

Example 17

Graft polymer consisting of
5% by weight of the addition product from propylene oxide onto glycerol MW 4200
15% by weight of N-methylacrylamide
25% by weight of diacetoneacrylamide
55% by weight of N-vinyl-N-methylacetamide Shear rate D (s$^{-1}$): 8.35, 11.1, 14.3, 19.0, 24.9, 35.3, 47.1, 61.5, 81.1, 106, 153.

Dynamic viscosity $\eta$ (mPa s): 73.5, 75.0, 71.9, 68.5, 65.5, 61.7, 58.3, 55.0, 51.7, 48.0, 43.5.

APPLICATION EXAMPLES

Example 18

A brown-state knitted cotton fabric (165 g/m$^2$) is impregnated on a pad-mangle with an aqueous liquor, which contains, per liter, 50 g of the dye of the formula 3.0 g of a wetting agent consisting of sodium pentadecane-1-sulfonate and the addition product from 4 mol of ethylene oxide onto 1 mol of a $C_9$–$C_{11}$ primary alcohol in the ratio of 3:1 by weight,
10 ml of the graft polymer prepared according to Example 1,
10 ml of sodium hydroxide solution (30%) and
75 ml of soda water glass solution having a silicate content of 26.3–27.7%, whereupon after padding a wet pick-up of 186% (calculated on the dry weight of the substrate) is obtained. The impregnated knitted fabric is rolled up and stored for 5 hours at room temperature. After this, the knitted fabric is rinsed and subsequently washed for 20 minutes at the boiling point with a non-ionic washing agent (0.5 g/l of the addition product from 9 mol of ethylene oxide onto 1 mol of nonyl phenol) in a liquor ratio of 40:1. The substrate is then rinsed again and dried. A strong and brilliant red dyeing is obtained, which is distinguished by having a particularly even appearance.

Similarly good results are obtained, when instead of the graft polymer according to Example 1, the identical amount in each case of a graft polymer prepared according to Examples 2 to 17 is used.

Example 19

A brown-state knitted cotton fabric with a weight per unit surface area of 165 g/m$^2$ is impregnated on a pad-mangle at 25° C. with a liquor which contains, per liter,
50 g of the dye of formula (11)
2.5 g of a wetting agent consisting of sodium pentadecane-1-sulfonate and the addition product from 4 mol of ethylene oxide onto 1 mol of a $C_9$–$C_{11}$ primary alcohol in the ratio by weight of 3:1,
4 ml of a graft polymer prepared according to Example 1,
10 ml of sodium hydroxide solution (30%) and
75 ml of soda water glass solution with a silicate content of 26.3–27.7%, whereupon a wet pick-up of 126% (calculated on the dry weight of the substrate) is achieved using a dipping time of 0.86 seconds and a roll pressure of 1.5 bar/cm$^2$. After this, the knitted fabric is rolled up, wrapped in a plastic film and treated for 3 minutes with microwaves at a frequency of 2450 MHz. Then the knitted fabric is rinsed and subsequently washed for 20 minutes at the boiling point with a non-ionic washing agent (0.5 g/l of the addition product from 9 mol of ethylene oxide onto 1 mol of nonyl phenol) in a liquor ratio of 40:1. The substrate is then rinsed again and dried.

A strong and brilliant red dyeing having good levelness is obtained.

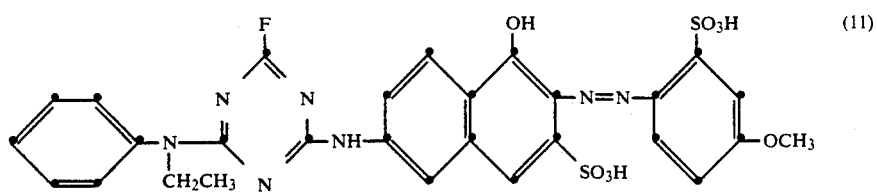

(11)

Example 20

A printing dye is prepared, which contains the following additives in 1 liter of water:
50 g of a dye of the formula

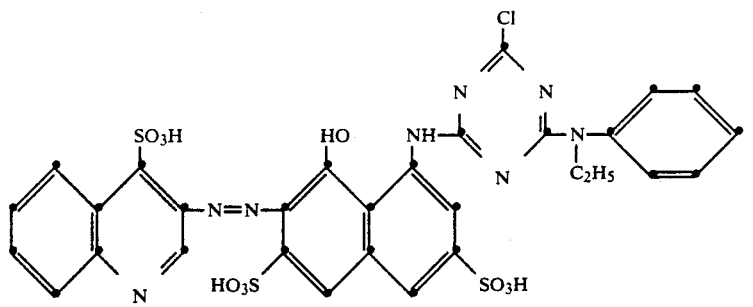

(12)

100 g of an aqueous mixture, which contains 7.5 g of an addition product from 2 mol of ethylene oxide onto 1 mol of cetyl alcohol, and 0.025 g of sodium lauryl sulfate, 4 g of the graft polymer prepared according to Example 1, 10 g of sodium m-nitrobenzenesulfonate, 60 g of a 25% aqueous sodium carbonate solution and 100 g of urea.

After this the printing dye is foamed in a closed system via foaming equipment. The degree of foaming is 180 g/l. The foam half life period is 20 hours. This foam is compressed through pipes via a screen onto a cotton woven fabric with a pressure of 0.40 bar. Thereupon, the printed woven fabric is steamed for 8 minutes at 102° C. and then soaped as usual and dried.

A strong, level and crisp red print is obtained having an excellent handle and good end-use fastness properties.

What is claimed is:

1. A process for dyeing textile materials which consist wholly or partially of cellulose fibers, with direct dyes or reactive dyes, which process comprises impregnating the cellulose materials with an aqueous dyeing liquor which, in addition to the dye, contains a graft polymer obtained from
   (A) 2–30% by weight of an adduct of an alkylene oxide with an at least trihydric aliphatic alcohol of 3 to 10 carbon atoms and
   (B) 70–98% by weight of a grafted-on monomer mixture of
      (1) 20 to 50% by weight of an N-substituted or N-unsubstituted acrylamide or methacrylamide and
      (2) 50 to 80% by weight of an N-vinyl-substituted amide or of a vinyl ester, derived in each case from a saturated aliphatic monocarboxylic acid,
   where the sums of (A) and (B), and (1) and (2) in each case add up to 100%, and subsequently fixing the dye by a heat treatment or by the cold pad-batch method.

2. A process according to claim 1, wherein the dyeing liquor additionally contains an alkali-resistant wetting agent.

3. A process according to claim 1 wherein the dyeing liquor contains the graft polymer in an amount of from 2 to 40 g per liter in the form of 3 to 10% aqueous solutions.

4. A process according to claim 1, wherein reactive dyes are used.

5. A process according to claim 1, wherein the heat treatment is carried out using microwaves.

6. A process according to claim 1, wherein the heat treatment is carried out by thermosoling.

7. A process according to claim 1, wherein the heat treatment is carried out by steaming.

8. A process according to claim 1, wherein the fixation of the dyes is carried out by the cold pad-batch method.

* * * * *